US00RE39487E

(19) United States
(12) Reissued Patent
Kono et al.

(10) Patent Number: US RE39,487 E
(45) Date of Reissued Patent: Feb. 13, 2007

(54) FLYWHEEL ASSEMBLY FOR INTERNAL COMBUSTION ENGINE

(75) Inventors: Satoshi Kono, Kanagawa (JP); Shizuaki Hidaka, Kanagawa (JP); Tetsu Takahashi, Kanagawa (JP)

(73) Assignee: Valeo Unisia Transmission Corporation, Atsugi (JP)

(21) Appl. No.: 08/629,547

(22) Filed: Apr. 9, 1996

Related U.S. Patent Documents

Reissue of:

(64) Patent No.: 5,465,635
Issued: Nov. 14, 1995
Appl. No.: 08/243,526
Filed: May 16, 1994

U.S. Applications:

(63) Continuation of application No. 07/485,659, filed on Feb. 27, 1990, now abandoned.

(30) Foreign Application Priority Data

Feb. 28, 1989 (JP) ..... 1-48816
Feb. 28, 1989 (JP) ..... 1-48817

(51) Int. Cl.
*F16C 3/04* (2006.01)
*G05G 1/00* (2006.01)

(52) U.S. Cl. ..... 74/595; 74/604; 74/572; 74/574; 464/68; 464/98

(58) Field of Classification Search ..... 74/572–574, 74/595, 604
See application file for complete search history.

(56) References Cited

U.S. PATENT DOCUMENTS

| | | | | | |
|---|---|---|---|---|---|
| 4,850,244 | A | * | 7/1989 | Eckel et al. | 74/572 |
| 4,889,009 | A | * | 12/1989 | Friedmann et al. | 74/572 X |
| 4,901,596 | A | * | 2/1990 | Reik et al. | 74/574 X |
| 4,904,226 | A | * | 2/1990 | Chasseguet et al. | 74/574 X |
| 4,932,286 | A | * | 6/1990 | Fukushima | 74/572 X |

FOREIGN PATENT DOCUMENTS

| | | | | | |
|---|---|---|---|---|---|
| EP | 0048563 | * | 3/1982 | | 74/574 |
| JP | 57-58542 | * | 3/1978 | | 74/572 |
| JP | 58-151734 | | 4/1982 | | |
| JP | 0090735 | * | 5/1984 | | 74/572 |
| JP | 61-233240 | * | 10/1986 | | 74/574 |
| JP | 63-190639 | * | 12/1988 | | 74/595 |
| JP | 64-11453 | | 1/1989 | | |
| JP | 1-67352 | * | 4/1989 | | 74/595 |

* cited by examiner

*Primary Examiner*—Vinh T. Luong
(74) *Attorney, Agent, or Firm*—Foley & Lardner LLP

(57) ABSTRACT

A crankshaft assembly for an internal combustion engine includes a crankshaft, an elastic member fixed to the crankshaft, and a flywheel fixed to the elastic member such that the flywheel is supported in an elastic relationship with the crankshaft. The elastic member has a rigidity in its rotating direction large enough to effectively transmit a driving power to a transmission through a clutch. On the other hand, the elastic member has a rigidity in an axial direction of the crankshaft small enough to shift a resonance frequency of a bending vibration out of a target frequency band of a forced vibration, while ensuring to prevent a failure of disengagement of the clutch.

65 Claims, 4 Drawing Sheets

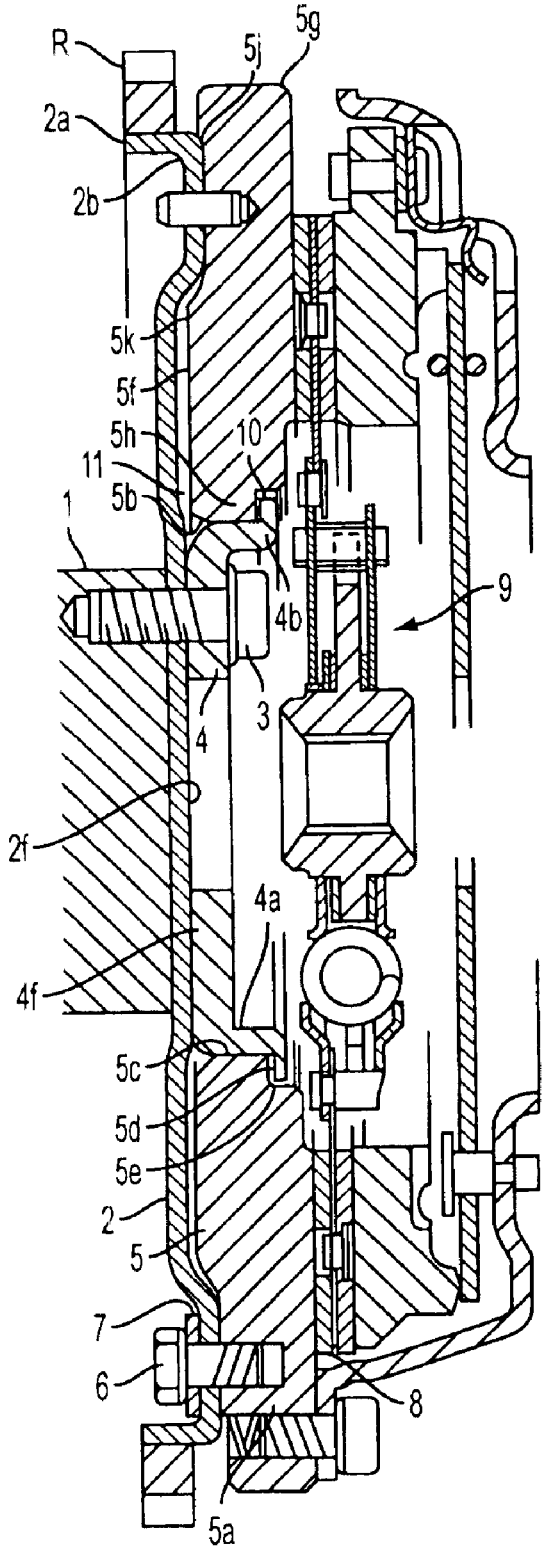
FIG. 1
AMENDED

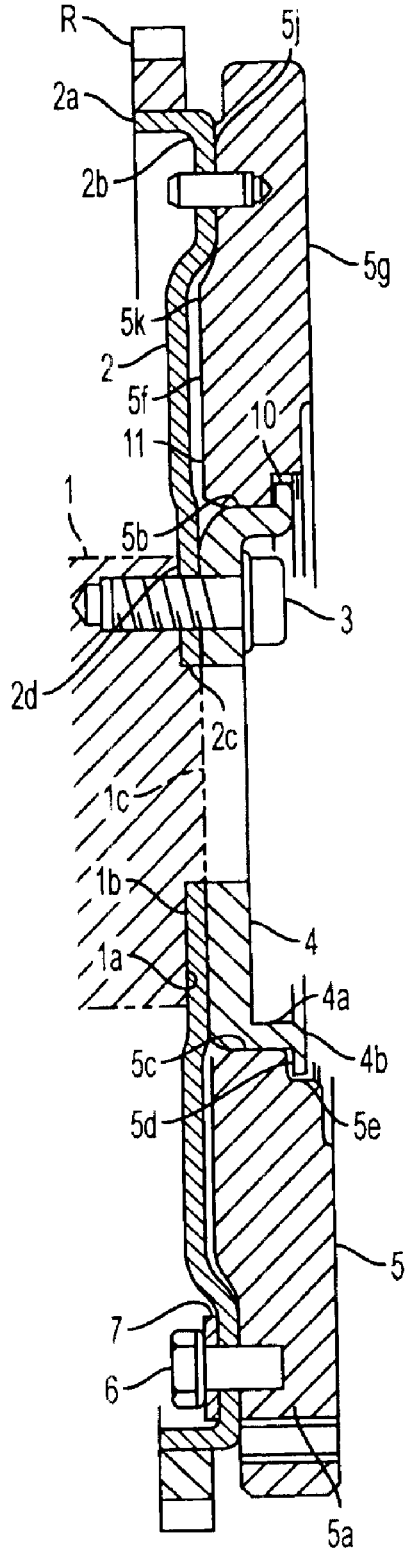
FIG. 3
AMENDED

FLYWHEEL ASSEMBLY FOR INTERNAL COMBUSTION ENGINE

Matter enclosed in heavy brackets [ ] appears in the original patent but forms no part of this reissue specification; matter printed in italics indicates the additions made by reissue.

This application is a continuation of application Ser. No. 07/485,659 filed Feb. 27, 1990 now abandoned.

BACKGROUND OF THE INVENTION

1. Field of the Invention

The present invention relates to a crankshaft assembly including a flywheel, for an internal combustion engine. More specifically, the present invention relates to a crankshaft assembly for an internal combustion engine, which can effectively shift a resonance frequency of a flexural or bending vibration of the crankshaft assembly out of a target frequency band of a forced vibration which results such as during acceleration of a vehicle so as to effectively prevent occurrence of a thick sound or noise in an engine room, while ensuring a quick response for clutch engaging and disengaging operations, and/or which can prevent occurrence of a fore and aft vibration of a vehicle floor at the time of engagement of the clutch.

2. Description of the Background Art

In a known crankshaft assembly for an internal combustion engine, a flywheel is directly connected to a crankshaft to use a mass of the flywheel mainly for reducing a torsional vibration generated in a rotating direction of the crankshaft assembly due to periodic torque fluctuation. However, the mass of the flywheel tends to generate a flexural or bending vibration in an axial direction of the crankshaft which causes a thick sound or noise in an engine room and thus in a vehicle compartment for an automotive vehicle, particularly at the time of the acceleration of the vehicle.

Accordingly, there has been proposed a crankshaft assembly such as disclosed in Second Japanese Patent Publication No. 57-58542, wherein the flywheel is connected to the crankshaft through an elastic or flexible plate. The elastic plate has a rigidity in its rotating direction large enough for effectively transmitting the power between the crankshaft and a transmission through a clutch, while the elastic plate has a rigidity in the axial direction small enough for shifting a resonance frequency of the bending vibration out of a frequency band of a forced vibration which results during the most frequently used engine speed (4,000 rpm) so as to overcome the above-noted problem.

However, the background art as mentioned above has the following problems.

When the rigidity of the elastic plate in the axial direction (hereinafter referred to as "the axial rigidity") is too small, a clutch stroke for engaging and disengaging the clutch is likely to become larger, resulting in a delayed response of the clutch engaging and disengaging operations leading particularly to failure of the clutch disengagement which is likely to cause such as an engine stall. On the other hand, when the axial rigidity of the elastic plate is too large, the deviation of the resonance frequency of the bending vibration from the target frequency band of the forced vibration can not be ensured.

Further, in the background art, when the flywheel is rotated, an axial run-out occurs on an engaging surface of the flywheel with a clutch facing of a clutch disc provided adjacent to the flywheel, due to a processing error and an assembling error of the elastic plate and the flywheel. Accordingly, when the clutch is engaged, a vibration is generated by a combination of the run-out of the engaging surface of the flywheel and the torque fluctuation of the engine, which is amplified by a vibration generated by the combustion in the engine cylinders and corresponding movement of associated members so as to cause a fore and aft vibration of the vehicle floor. Such vibration is uncomfortable for the driver and passengers in the vehicle compartment.

SUMMARY OF THE INVENTION

Therefore, it is an object of the present invention to provide a crankshaft assembly for an internal combustion engine that can eliminate the above-noted defects inherent in the background art.

It is another object of the present invention to provide a crankshaft assembly for an internal combustion engine that can effectively shift a resonance frequency of a flexural or bending vibration of the crankshaft assembly out of a target frequency band of a forced vibration, particularly out of a target frequency band which results during acceleration of a vehicle so as to effectively prevent occurrence of a thick sound or noise in an engine room, while ensuring a quick response of the clutch engagement and disengagement operations so as to prevent particularly the failure of the clutch disengagement which is likely to cause such as an engine stall.

It is still another object of the present invention to provide a crankshaft assembly for an internal combustion engine that can prevent occurrence of a fore and aft vibration of a vehicle floor at the time of the engagement of the clutch by effectively eliminating an axial run-out of an engaging surface of a flywheel with a clutch facing generated during rotation of the flywheel.

To accomplish the above mentioned and other objects, according to one aspect of the present invention, a crankshaft assembly for an internal combustion engine comprises a crankshaft for transmitting a driving power to a transmission through a clutch, an elastic member fixed to the crankshaft, and a flywheel fixed to the elastic member such that the flywheel is supported in an elastic relationship with the crankshaft.

The flywheel has an engageable surface at a side opposite to the elastic member in an axial direction of the crankshaft, and the engageable surface is engageable with an associated member of the clutch to receive a load therefrom in the axial direction when the engageable surface is engaged with the associated member of the clutch.

The elastic member has a first predetermined rigidity in its rotating direction, the first predetermined rigidity being large enough to effectively transmit the driving power to the transmission through the clutch. On the other hand, the elastic member has a second predetermined rigidity in the axial direction, the second predetermined rigidity being small enough to shift a resonance frequency of a bending vibration out of a target frequency band of a forced vibration, while ensuring to prevent a failure of disengagement between the engageable surface of the flywheel and the associated member of the clutch.

According to another aspect of the present invention, a method for forming a crankshaft assembly for an internal combustion engine comprises steps of fixing a flywheel to an elastic member to form a unit, assembling the unit onto the crankshaft with the elastic member mounted onto the crankshaft so as to support the flywheel in an elastic relationship with the crankshaft, and processing an engageable surface of the flywheel, which is engageable with an associated member of a clutch, based on an assembled condition between the elastic member and the crankshaft so as to minimize an axial run-out of the engageable surface.

According to still another aspect of the present invention, a crankshaft assembly for an internal combustion engine comprises a crankshaft for transmitting a driving power to a transmission through a clutch, an elastic member fixed to the crankshaft, and a flywheel fixed to the elastic member such that the flywheel is supported in an elastic relationship with the crankshaft.

The flywheel has an engageable surface at a side opposite to the elastic member in an axial direction of the crankshaft, and the engageable surface is engageable with an associated member of the clutch to control transmission of the driving power between the crankshaft and the transmission.

The engageable surface is designed to have an axial run-out which is no more than 0.1 mm for ensuring a smooth engagement with the associated member of the clutch.

BRIEF DESCRIPTION OF THE DRAWINGS

The present invention will be understood more fully from the detailed description given hereinbelow and from the accompanying drawings of the preferred embodiment of the invention, which are given by way of example only, and are not intended to be limitative of the present invention.

In the drawings:

FIG. 1 is a longitudinal cross section of a crankshaft assembly for an internal combustion engine according to a first preferred embodiment of the present invention;

FIG. 3 is a longitudinal cross section of a crankshaft assembly [fop] *for* an internal combustion engine according to a second preferred embodiment of the present invention.

DESCRIPTION OF THE PREFERRED EMBODIMENT

Figure 2:
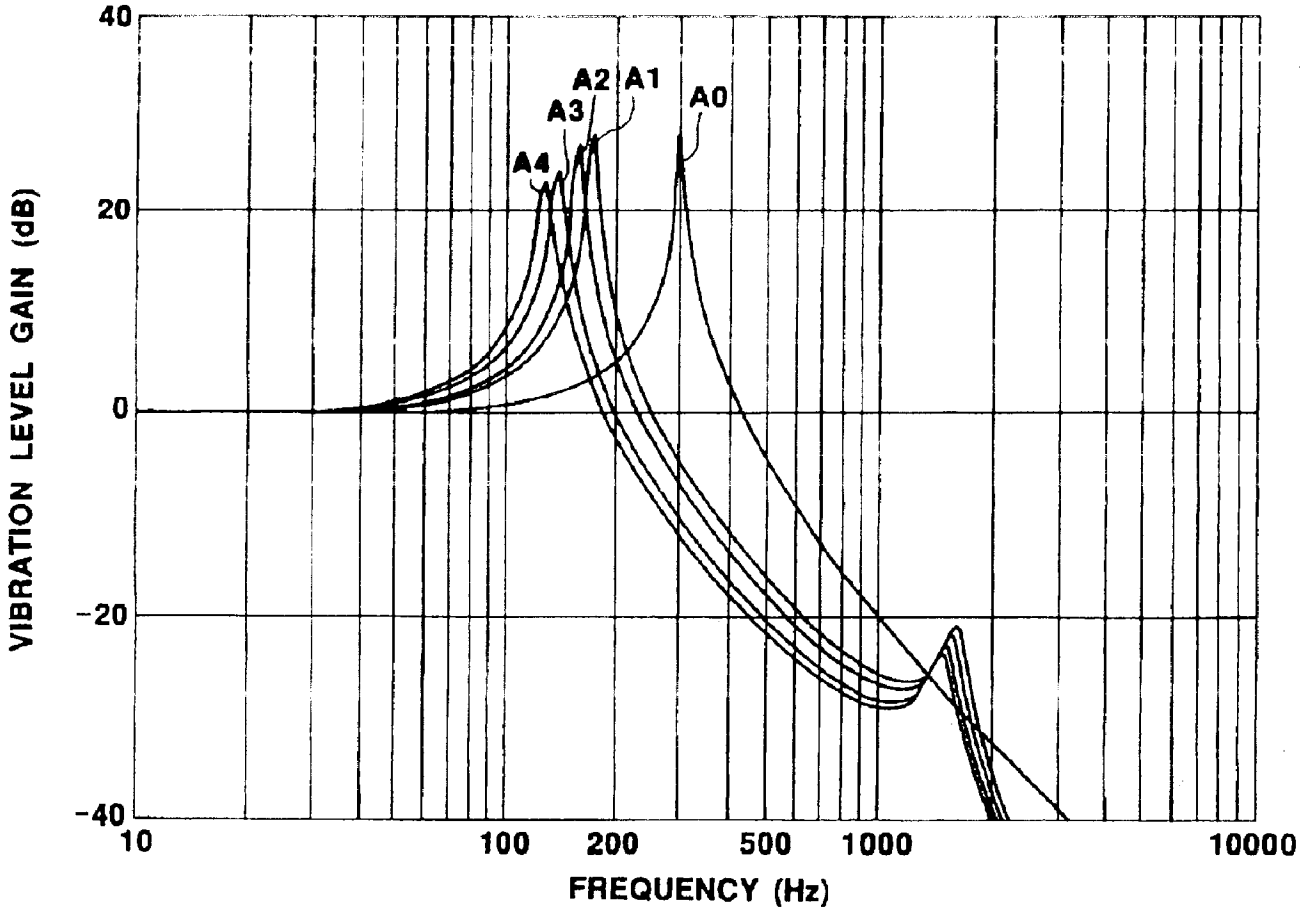
FIG. 2 is a graph of vibration level versus frequency showing a shift of a resonance frequency of a flexural or bending vibration by changing a rigidity of an elastic or flexible plate in an axial direction of a crankshaft.

Now, a [crankshaft] *flywheel* assembly for an internal combustion engine according to preferred embodiments of the present invention will be described hereinbelow with reference to FIGS. 1 to 4.

FIG. 1 shows a first preferred embodiment of the present invention. An engine crankshaft 1 is connected to pistons through respective connecting rods in a known manner for receiving the driving power therefrom. An elastic plate 2 *of this example is* substantially of a disc shape*, and* is fixed*, at its inner portion 2f,* to one *shaft* end of the crankshaft 1 by a plurality of bolts 3. The elastic plate 2 [is formed at its] *has an* outer peripheral [edge] portion *2b which is formed* with an axially extending [section] *flange* 2a to which a ring gear R is fixed. The ring gear R engages with pinion gears of an engine starter motor for transmitting the driving power from the engine starter motor to the crankshaft 1 when starting the engine.

An annular reinforcing member 4 is disposed between the elastic plate 2 and heads of the bolts 3. The reinforcing member 4 is formed at its outer peripheral edge portion with a *received portion 4a which is in this example* cylindrical [section 4a extending] *and extends* in an axial direction of the crankshaft 1. [and with] *The reinforcing member 4 of this example further has* a radially *outwardly* extending [section] *flange* 4b *in the form of an outward flange, as shown in FIG. 1. The inner portion 2f of the elastic plate 2 is clamped between the reinforcing member 4 and the shaft end of the crankshaft 1.*

A flywheel body 5 of an annular shape is fixed to the elastic plate 2 at their respective outer peripheral edge portions 5a and 2b through a plurality of bolts 6 and corresponding reinforcing members 7 disposed between the elastic plate 2 and heads of the bolts 6. The annular flywheel body 5 has a stepped inner peripheral edge surface defining a mounting opening 5b for receiving the reinforcing member 4 therein. The stepped inner peripheral edge surface has a first section 5c extending axially, a second section 5d extending radially outward from the first section 5c and a third section 5e extending axially from the second section 5d. The axial section 4a of the reinforcing member 4 is in a slidable contact with the first section 5c of the flywheel body 5, and the radial section 4b of the reinforcing member 4 is spaced from the second section 5d of the flywheel body 5 by a predetermined distance for allowing an axial movement of the flywheel along with the elastic plate 2. A radially extending inner surface 5f of the flywheel facing the elastic plate 2 is spaced apart from the elastic plate 2 by a predetermined distance for ensuring an elasticity of the elastic plate 2. *In other words, a first clearance or second free space is provided between inner surface 5f and the elastic plate 2 for allowing axial movement of the flywheel body.*

The flywheel body 5 further includes a radially extending *side* surface 5g at a side axially opposite to the [radial] *side* surface 5f or the elastic plate 2. The [radial] *radially extending side* surface 5g is *an engaging surface which is* engageable with a clutch facing 8 of a clutch disc 9 of a clutch in a known manner so as to control the transmission of the power between the crankshaft 1 and a transmission.

A rigidity of the elastic plate 2 in its rotating direction (hereinafter referred to as "the circumferential rigidity") is set large enough for effectively transmitting the power between the crankshaft 1 and the transmission through the clutch, while a rigidity of the elastic plate 2 in the axial direction (hereinafter referred to as "the axial rigidity") is set small enough for shifting a resonance frequency of the flexural or bending vibration out of a frequency band of a forced vibration which results during the acceleration of the engine.

As described in the background art, when the axial rigidity of the elastic plate is too small, a clutch stroke for engaging and disengaging the clutch becomes larger, i.e. a clutch stroke loss gets larger, resulting in delayed response of the clutch engaging and disengaging operations leading particularly to the failure of the clutch disengagement which is likely to cause such as an engine stall. On the other hand, when the axial rigidity of the elastic plate is too large, the deviation of the resonance frequency of the bending vibration from the target frequency band of the forced vibration can not be attained.

To overcome the above-noted problem, the axial rigidity of the elastic plate 2 in this embodiment is set to 600 kg/mm to 2200 kg/mm, wherein an axial displacement of the radial surface 5g of the flywheel 5 is no more than 1 mm when an axial load or force 600 kg to 2200 kg is applied to the radial surface 5g. By selecting a value of the axial rigidity of the elastic plate 2 within the foregoing range, not only is the failure of the clutch disengagement effectively prevented, but also the deviation of the resonance frequency of the bending vibration from the frequency band of the forced vibration, during the acceleration of the engine in this embodiment, is effectively attained so as to prevent generation of the thick sound or noise in the engine room.

Specifically, it is confirmed that the failure of the clutch disengagement, i.e. the failure of the disengagement between the radial surface 5g of the flywheel and the clutch facing 8 of the clutch disc 9, happens when an axial displacement of the radial surface 5g at the time of engagement with the clutch facing 8 exceeds 5% of a normal clutch stroke (normally at 7 mm to 8 mm) [fur] *for* engaging and disengaging the clutch. The normal clutch stroke is a distance between the radial surface 5g of the flywheel body 5 and the clutch facing 8 in a disengagement or released condition of the clutch. Accordingly, considering that an axial load applied to the flywheel body 5 through the clutch facing 8 is normally at 150 kg to 200 kg, the lower limit value 600 kg/mm of the axial rigidity of the elastic plate is selected, wherein the axial displacement of the radial surface 5g is within 5% of the normal clutch stroke when applied with the axial load 150 kg to 200 kg, as shown in TABLE 1.

TABLE 1

| AXIAL LOAD | AXIAL RIGIDITY | AXIAL DISPLACEMENT |
|---|---|---|
| 150 kg | 500 kg/mm | 0.30 mm (3.8 to 4.3%) |
| 200 kg | 500 kg/mm | 0.40 mm (5.0 to 5.7%) |
| 150 kg | 600 kg/mm | 0.25 mm (3.1 to 3.6%) |
| 200 kg | 600 kg/mm | 0.33 mm (4.1 to 4.7%) |
| 150 kg | 700 kg/mm | 0.21 mm (2.6 to 3.0%) |
| 200 kg | 700 kg/mm | 0.29 mm (3.6 to 4.1%) |

(wherein, percentage denotes a rate of the axial displacement relative to the normal clutch stroke which is 7 to 8 mm)

As seen from TABLE 1, the lower limit value 600 kg/mm of the axial rigidity of the elastic plate 2 ensures the axial displacement of the radial surface 5g of the flywheel body 5 within 5% of the normal clutch stroke, i.e. the axial displacement of the radial surface 5g is between 0.25 to 0.33 mm or between 3.1 to 4.7% relative to the normal clutch stroke when applied with the normal axial load at 150 to 200 kg through the clutch facing 8, so that the failure of the clutch disengagement is effectively prevented. Naturally, the larger the axial rigidity of the elastic plate gets, the smaller the axial displacement of the flywheel gets.

Now, the axial rigidity of the elastic plate 2 will be considered in view of shifting of the resonance frequency of the bending vibration out of a frequency band of a forced vibration which results during the acceleration of the engine where the sound or noise generated by the bending vibration is the most significant. It is confirmed that the sound or noise generated by the bending vibration is effectively reduced when the resonance frequency is shifted out of the frequency band of the forced vibration during the acceleration of the engine.

FIG. 2 is a graph of bending vibration level versus frequency showing a result of experiments using various elastic plates having different axial rigidities. The frequency band of the forced vibration during the acceleration of the engine is 200 Hz to 500 Hz. In FIG. 2, a line Ao shows a relationship between the frequency and the bending vibration level without using the elastic plate, i.e. the flywheel is directly connected to the crankshaft. As can be seen, a resonance frequency of the line Ao is within 200 Hz to 500 Hz, which causes the sound or noise problem. A line A1 is derived by the elastic plate having the axial rigidity of 2200 kg/mm, a line A2 is derived by the elastic plate having the axial rigidity of 1700 kg/mm, line A3 is derived by the elastic plate having the axial rigidity of 1200 kg/mm, and a line A4 is derived by the elastic plate having the axial rigidity of 1000 kg/mm. As can be seen, the resonance frequency of each of the lines A1 to A4 is shifted out of the frequency band 200 Hz to 500 Hz, and further, the vibration level of each of the lines A1 to A4 is considerably lower than the line Ao within the frequency band 200 Hz to 500 Hz. Though the line A1 has a vibration level higher than the line Ao around 200 Hz, this happens in a very small range of frequency. Accordingly, the value 2200 kg/mm is selected as an upper limit value of the axial rigidity of the elastic plate, and the value 1700 kg/mm is selected as a more preferable upper limit value of the axial rigidity.

In light of the above, the axial rigidity of the elastic plate 2 in this embodiment is selected at 600 kg/mm to 2200 kg/mm, and preferably at 600 kg/mm to 1700 kg/mm.

As understood from the above description, this first embodiment, when the crankshaft 1 is rotated, the flywheel body 5 is ensured to rotate with the crankshaft 1 by means of the large circumferential rigidity of the elastic plate 2. When the clutch is engaged and the engine is accelerated, the driving power is transmitted to the transmission with a very low bending vibration level by means of the axial rigidity of the elastic plate being no more than 2200 kg/mm, so that the vehicle compartment can be kept quiet. On the other hand, when the clutch is disengaged, since the axial displacement of the flywheel is no more than 5% of the normal clutch stroke by means of the axial rigidity of the elastic plate being no less than 600 kg/mm, the failure of the disengagement of the clutch is effectively prevented.

FIG. 3 shows a [crankshaft] *flywheel* assembly for an internal combustion engine according to a second embodiment of the present invention. In FIG. 3, the same or like parts or members are denoted by the same reference numerals. In the following description, explanations of those same or like members will be omitted to avoid redundant description. Further, though the clutch assembly is not shown in FIG. 3, the same clutch assembly including the clutch disc 9 and the clutch facing 8 is provided in the same manner as in FIG. 1.

In FIG. 3, the crankshaft 1 includes a stepped end surface having a first section 1a extending radially inward from its outer peripheral edge, a second section 1b extending axially from the inward end of the first section 1a toward the clutch disc 9, and a third circular section 1c extending radially from the second section 1b. The elastic plate 2 is of an annular shape having a mounting opening at its center for receiving the second section 1b therethrough. The elastic plate 2 is fixed to the crankshaft 1 with its axially extending inward end 2c facing the second section of the crankshaft 1 and with its radially extending inward end portion 2d facing the first section of the crankshaft. The other structure is substantially the same as in FIG. 1.

As mentioned in the background art, when the flywheel body 5 is rotated through the crankshaft 1, an axial run-out is generated on the radial *engaging* surface 5g due to the processing error and the assembling error of the elastic plate 2 and the flywheel body 5 to cause the vibration when the clutch is engaged. The vibration further causes the fore and aft vibration of the vehicle floor.

In order to overcome the above-noted problem, in this embodiment, the radial *engaging* surface 5g is processed in a manner to make an amount of the axial run-out no more than 0.1 mm. Specifically, the processing of the radial *engaging* surface 5g is performed in the following manner.

The flywheel body 5 is first fixed to the elastic plate 2 by the bolts 6. Then, this unit is assembled to the crankshaft 1 with the axially extending inward end 2c of the elastic plate 2 facing the second section 1b of the crankshaft 1 and with the radially extending inward end portion 2d facing the first section 1a of the crankshaft. Then, the radial *engaging* surface 5g is processed based on the assembled condition between the axially extending inward end 2c and the second section 1b and/or between the radially extending inward end portion 2d and the first section 1a to make the axial run-out of the radial surface 5g no more than 0.1 mm.

By using the above-noted manner, the radial *engaging* surface 5g is easily and precisely processed to make the amount of the axial run-out no more than 0.1 mm.

Figure 4:
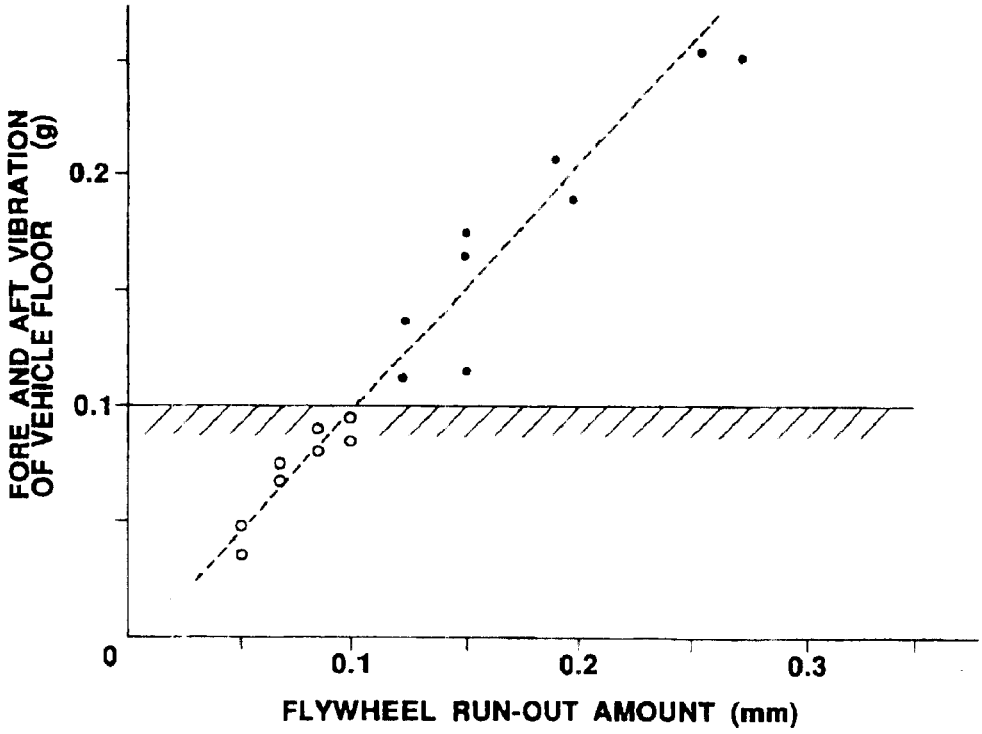
FIG. 4 is a graph of fore and aft vibration of vehicle floor versus flywheel run-out amount, showing a relationship between an amount of an axial run-out of a flywheel and a fore and aft vibration of a vehicle floor.

FIG. 4 is a graph of axial run-out amount of flywheel (radial *engaging* surface 5g) versus fore and aft vibration of vehicle floor showing a result of experiments. It is confirmed that the fore and aft vibration of the vehicle floor which does not give a uncomfortable feeling to a human body is normally no more than 0.1 G (gravitational acceleration). As can be seen from FIG. 4, a fore and aft vibration of the vehicle floor is substantially in direct proportion to an amount of the axial run-out of the radial *engaging* surface 5g, and the fore and aft vibration becomes no more than 0.1 G when the axial run-out becomes no more than 0.1 mm. Accordingly, by making the amount of the axial run-out no more than 0.1 mm as in this embodiment, the fore and aft vibration can be made no more than 0.1 G.

As understood from the above description, in this second embodiment, when the crankshaft 1 is rotated, the flywheel body 5 is ensured to rotate with the crankshaft 1 by means of the large circumferential rigidity of the elastic plate 2. Since the amount of the axial run-out of the radial *engaging* surface 5g is no more than 0.1 mm, the engagement between the radial *engaging* surface 5g and the clutch facing 8 is performed quite smoothly, so that the fore and aft vibration does not exceed 0.1 G. Accordingly, the driving power is transmitted from the engine to the transmission without giving the uncomfortable feeling to the human body.

It is to be appreciated that in this second embodiment, the axial rigidity of the elastic plate 2 is not necessarily selected at 600 kg/mm to 2200 kg/mm.

It is to be understood that the invention is not to be limited to the embodiments described above, and that various changes and modifications may be made without departing from the spirit and scope of the invention as defined in the appended claims.

What is claimed is:

[1. A flywheel for a power transmission system for transmitting engine torque to a driven unit, comprising:

an elastic plate secured to a crankshaft to rotate therewith;

a flywheel body secured to said elastic plate and having an engageable surface for engaging with a clutch disc; and a reinforcing member for reinforcing said elastic plate at a portion of said elastic plate which is secured to said crankshaft;

said elastic plate having an axial rigidity in the range of 600 kg/mm to 2200 kg/mm so as to ensure transmission of engine torque to said driven unit, while decreasing noise produced by a bending vibration of said crankshaft;

wherein each of said elastic plate, said flywheel body and said reinforcing member comprises a first portion, said first portion of said flywheel body being placed axially between said first portion of said elastic plate and said reinforcing member, and said first portions of said elastic plate, said flywheel body and said reinforcing member defining clearances for allowing said first portion of said flywheel body to move axially between said first portions of said elastic plate and said reinforcing member.]

[2. A flywheel as set forth in claim 1, wherein said axial rigidity is in the range of 600 kg/mm to 1700 kg/mm.]

[3. A flywheel as set forth in claim 2, wherein an axial run-out of said engageable surface when rotated by said crankshaft is no more than 0.1 mm.]

[4. A flywheel according to claim 1, wherein said reinforcing member (4) and said elastic plate (2) are fastened to said crankshaft (1) by a fastening means (3), and said elastic plate is clamped between said crankshaft and said reinforcing member.]

[5. A flywheel according to claim 4, wherein said elastic plate is circular and comprises an outer peripheral portion (2b) surrounding said first portion of said elastic plate, so that said first portion of said elastic plate is an inner portion of said elastic plate, said flywheel body comprises an outer peripheral portion (5a) which surrounds said first portion of said flywheel body, so that said first portion of said flywheel body is an inner portion of said flywheel body, said outer peripheral portions of said elastic plate and said flywheel body are fastened together by a second fastening means (6), said inner portion of said flywheel body comprises an inwardly facing inside cylindrical surface defining a central circular hole (5b), said reinforcing member comprises a cylindrical portion (4a) which is received in said circular hole (5b) of said flywheel body, and comprises an outwardly facing outside cylindrical surface surrounded by said inwardly facing cylindrical surface of said flywheel body, said first portion of said reinforcing member is in the form of an outward flange (4b), said first portion of said flywheel body is slidably mounted on said cylindrical portion of said reinforcing member so that said first portion of said flywheel body is axially slidable between said inner portion of said elastic plate and said outward flange of said reinforcing member.]

[6. A flywheel according to claim 4, wherein said inner portion of said flywheel body comprises a first surface (5f) which is substantially parallel to said engageable surface (5g) and which faces toward said elastic plate, and a second surface (5d) which is substantially parallel to said engageable surface and which faces toward said outward flange of said reinforcing member, said inner portion of said elastic plate comprising an abutting surface confronting said first surface of said flywheel body and limiting an axial movement of said inner portion of said elastic plate by abutting against said first surface of said flywheel body, said outward flange of said reinforcing member comprises an abutting surface confronting said second surface of said flywheel body and limiting the axial movement of said inner portion of said flywheel body by abutting against said second surface of said flywheel body, an axial distance between said first and second surfaces of said flywheel body is smaller than an axial distance between said abutting surfaces of said elastic member and said reinforcing member.]

[7. A flywheel according to claim 6, wherein said second surface (5d) of said inner portion of said flywheel body is located axially between said first surface (5f) and said engageable surface (5g) of said flywheel body.]

[8. A flywheel for a power transmission system for transmitting engine torque to a driven unit, comprising:

an elastic plate secured to a crankshaft to rotate therewith;

a flywheel body secured to said elastic plate and having an engageable surface for engaging with a clutch disc; and a reinforcing member for reinforcing said elastic plate at a portion of said elastic plate which is secured to said crankshaft; and said engageable surface having an axial run-out which is equal to or less than 0.1 mm;

wherein each of said elastic plate, said flywheel body and said reinforcing member comprises a first portion, said first portion of said flywheel body being placed axially between said first portions of said elastic plate and said reinforcing member, and said first portions of said elastic plate, said flywheel body and said reinforcing member defining clearances for allowing said first portion of said flywheel body to move axially between said first portions of said elastic plate and said reinforcing member.]

[9. A flywheel assembly comprising:

a driving shaft (1) for transmitting torque;

a circular elastic member (2) comprising an outer portion and an inner portion and extending radially inwardly from said outer portion to said inner portion, said inner portion of said elastic member being fastened to a shaft end of said driving shaft;

an annular flywheel member (5) comprising an outer portion and an inner portion and extending radially inwardly from said outer portion to said inner portion of said flywheel member, said outer portion of said flywheel member being fastened to said outer portion of said elastic member, said inner portion of said flywheel member comprising a central circular hole; and a reinforcing member (4) comprising a cylindrical portion (4a) axially extending from a first end to a second end, an inner portion extending radially inwardly from said first end of said cylindrical portion, and an outward flange (4b) extending radially outwardly from said second end of said cylindrical portion, said inner portion of said reinforcing member being fastened to said shaft end of said driving shaft, said cylindrical portion of said reinforcing member being fit in said circular hole of said flywheel member with a clearance to form a loose fit;

wherein said inner portion of said elastic member is fixedly clamped between said shaft end of said driving shaft and said inner portion of said reinforcing member, said inner portion of said flywheel member is loosely fit over said cylindrical portion of said reinforcing member and located axially between said inner portion of said elastic member and said outward flange of said reinforcing member, said outward flange is axially spaced from said inner portion of said elastic member at an axial distance which allows axial movement of said inner portion of said flywheel body between said inner portion of said elastic member and said outward flange of said reinforcing member.]

[10. A flywheel assembly according to claim 3, wherein said elastic member has an axial rigidity which is in the range of 600 kg/mm to 2200 kg/mm.]

[11. A flywheel assembly according to claim 9, wherein a wall thickness of said inner portion of said reinforcing member is greater than a wall thickness of each of said outward flanges of said reinforcing member and said inner portion of said elastic member, said wall thickness of each of said inner portion and said outward flange of said reinforcing member and said inner portion of said elastic member being a dimension measured in an axial direction parallel to an axis of said driving shaft.]

[12. A flywheel assembly according to claim 9, further comprising a first fastening means for fastening said outer portions of said elastic member and said flywheel member together, and a second fastening means for fastening said inner portions of said elastic member and said reinforcing member to said shaft end of said driving shaft, each of said first and second fastening means comprises screw fasteners extending axially along an axis of said driving shaft.]

*13. A flywheel assembly for a power transmission system for transmitting engine torque, comprising:*

*an elastic plate secured to a crankshaft to rotate therewith;*

*a flywheel body secured to said elastic plate and having an engaging surface for engaging with a clutch disc; and*

*a reinforcing member for reinforcing said elastic plate at a portion of said elastic plate which is secured to said crankshaft;*

*said elastic plate having an axial rigidity in the range of 600 kg/mm to 2200 kg/mm so as to ensure transmission of engine torque through said flywheel assembly while decreasing noise produced by a bending vibration of said crankshaft;*

*wherein each of said elastic plate, said flywheel body and said reinforcing member comprises a first portion, said first portion of said flywheel body being placed axially between said first portions of said elastic plate and said reinforcing member, and said first portions of said elastic plate, said flywheel body and said reinforcing member defining clearances for allowing said first portion of said flywheel body to move axially between said first portions of said elastic plate and said reinforcing member.*

*14. A flywheel assembly as set forth in claim 13, wherein said axial rigidity is in the range of 600 kg/mm to 1700 kg/mm.*

*15. A flywheel assembly as set forth in claim 14, wherein an axial run-out of said engaging surface when rotated by said crankshaft is no more than 0.1 mm.*

*16. A flywheel assembly according to claim 13, wherein said reinforcing member (4) and said elastic plate (2) are fastened to said crankshaft (1) by a fastening means (3), and said elastic plate is clamped between said crankshaft and said reinforcing member.*

*17. A flywheel assembly according to claim 16, wherein said elastic plate is circular and comprises an outer peripheral portion (2b) surrounding said first portion of said elastic plate, so that said first portion of said elastic plate is an inner portion of said elastic plate, said flywheel body comprises an outer peripheral portion (5a) which surrounds said first portion of said flywheel body, so that said first portion of said flywheel body is an inner portion of said flywheel body, said outer peripheral portions of said elastic plate and said flywheel body are fastened together by a second fastening means (6), said inner portion of said flywheel body comprises an inwardly facing inside cylindrical surface defining a central circular hole (5b), said rein-*

*forcing member comprises a cylindrical portion (4a) which is received in said circular hole (5b) of said flywheel body, and comprises an outwardly facing outside cylindrical surface surrounded by said inwardly facing cylindrical surface of said flywheel body, said first portion of said reinforcing member is in the form of an outward flange (4b), said first portion of said flywheel body is mounted on said cylindrical portion of said reinforcing member, and said cylindrical portion of said reinforcing member is sized to allow said first portion of said flywheel body to slide axially between said inner portion of said elastic plate and said outward flange of said reinforcing member.*

*18. A flywheel assembly according to claim 16, wherein said inner portion of said flywheel body comprises a first surface (5f) which is substantially parallel to said engaging surface (5g) and which faces toward said elastic plate, and a second surface (5d) which is substantially parallel to said engaging surface and which faces toward said outward flange of said reinforcing member, said inner portion of said elastic plate comprising an abutting surface confronting said first surface of said flywheel body and limiting an axial movement of said inner portion of said flywheel body by abutting against said first surface of said flywheel body, said outward flange of said reinforcing member comprises an abutting surface confronting said second surface of said flywheel body and limiting the axial movement of said inner portion of said flywheel body by abutting against said second surface of said flywheel body, an axial distance between said first and second surfaces of said flywheel body is smaller than an axial distance between said abutting surfaces of said elastic member and said reinforcing member.*

*19. A flywheel assembly according to claim 18, wherein said second surface (5d) of said inner portion of said flywheel body is located axially between said first surface (5f) and said engaging surface (5g) of said flywheel body.*

*20. A flywheel assembly for a power transmission system for transmitting engine torque, comprising:*

*an elastic plate secured to a crankshaft to rotate therewith;*

*a flywheel body secured to said elastic plate and having an engaging surface for engaging with a clutch disc; and*

*a reinforcing member for reinforcing said elastic plate at a portion of said elastic plate which is secured to said crankshaft; and*

*said engaging surface having an axial run-out which is equal to or less than 0.1 mm;*

*wherein each of said elastic plate, said flywheel body and said reinforcing member comprises a first portion, said first portion of said flywheel body being placed axially between said first portions of said elastic plate and said reinforcing member, and said first portions of said elastic plate, said flywheel body and said reinforcing member defining clearances for allowing said first portion of said flywheel body to move axially between said first portions of said elastic plate and said reinforcing member.*

*21. A flywheel assembly comprising:*

*a crankshaft (1) for transmitting torque;*

*a circular elastic plate (2) comprising an outer portion and an inner portion and extending radially inwardly from said outer portion to said inner portion, said inner portion of said elastic plate being fastened to a shaft end of said crankshaft;*

*an annular flywheel body (5) comprising an outer portion and an inner portion and extending radially inwardly from said outer portion to said inner portion of said flywheel body, said outer portion of said flywheel body being fastened to said outer portion of said elastic plate, said inner portion of said flywheel body comprising a central circular hole; and*

*a reinforcing member (4) comprising a cylindrical portion (4a) axially extending from a first member end to a second member end, an inner portion extending radially inwardly from said first member end of said cylindrical portion, and an outward flange (4b) extending radially outwardly from said second member end of said cylindrical portion, said inner portion of said reinforcing member being fastened to said shaft end of said crankshaft, said cylindrical portion of said reinforcing member being fit in said circular hole of said flywheel body with a clearance to form a loose fit;*

*wherein said inner portion of said elastic plate is fixedly clamped between said shaft end of said crankshaft and said inner portion of said reinforcing member, said inner portion of said flywheel body is fit over said cylindrical portion of said reinforcing member and located axially between said inner portion of said elastic plate and said outward flange of said reinforcing member, said outward flange is axially spaced from said inner portion of said elastic plate at an axial distance which allows axial movement of said inner portion of said flywheel body between said inner portion of said elastic plate and said outward flange of said reinforcing member.*

*22. A flywheel assembly according to claim 21, wherein said elastic plate has an axial rigidity which is in the range of 600 kg/mm to 2200 kg/mm.*

*23. A flywheel assembly according to claim 21, wherein a wall thickness of said inner portion of said reinforcing member is greater than a wall thickness of each of said outward flange of said reinforcing member and said inner portion of said elastic plate said wall thickness of each of said inner portion and said outward flange of said reinforcing member and said inner portion of said elastic plate being a dimension measured in an axial direction parallel to an axis of said crankshaft.*

*24. A flywheel assembly according to claim 21, further comprising a first fastening means for fastening said outer portions of said elastic plate and said flywheel body together, and a second fastening means for fastening said inner portions of said elastic plate and said reinforcing member to said shaft end of said crankshaft, each of said first and second fastening means comprises screw fasteners extending axially along an axis of said crankshaft.*

*25. A flywheel assembly for a power transmission system for transmitting engine torque comprising:*

*a crankshaft;*

*an elastic plate comprising an inner portion secured to a shaft end of said crankshaft;*

*a flywheel body secured to said elastic plate and having an engaging surface for engaging with the clutch disc; and*

*a reinforcing member for reinforcing said elastic plate at said inner portion of said elastic plate;*

*wherein said elastic plate has an axial rigidity in the range of 600 kg/mm to 2200 kg/mm so as to ensure transmission of engine torque through said flywheel assembly, while decreasing noise produced by a bending vibration of said crankshaft;*

*wherein said elastic plate is clamped axially between said reinforcing member and said shaft end of said crankshaft, and*

*wherein a first portion of said flywheel moves axially with respect to said reinforcing member and said elastic plate,*

*wherein said reinforcing member has a radially extending portion which extends at least inwardly of said flywheel body, and wherein said elastic plate comprises a first portion, said first portion of said flywheel body being placed axially after said first portion of said elastic plate, and said first portions of said flywheel body and said elastic plate defining a first clearance and said flywheel body having a first free space on a side opposite of the first clearance for allowing said first portion of said flywheel body to move axially within the first clearance and the free space.*

*26. A flywheel assembly as set forth in claim 25, wherein said flywheel body comprises an inner portion defining a circular central hole, and an outer portion surrounding said inner portion of said flywheel body; said elastic plate comprises an outer portion which surrounds said inner portion of said elastic plate and which is fixed to said outer portion of said flywheel body; said reinforcing member is fit in said central hole of said flywheel body with a clearance to form a loose fit; and said reinforcing member comprises an outer circumferential surface for allowing said inner portion of said flywheel body to move axially to said elastic plate without limiting an axial movement of the inner potion of said flywheel body toward said elastic plate.*

*27. A flywheel assembly as set forth in claim 26, wherein said reinforcing member extends axially from a first member end defined by a radially extending abutment surface held in contact with said elastic plate, to a second member end; said outer circumferential surface of said reinforcing member extends from said abutment surface toward said second member end of said reinforcing member; said outer circumferential surface of said reinforcing member comprises an outer cylindrical surface section fit in said central hole of said flywheel body, and an outer curved surface section which extends continuously from said outer cylindrical surface section to said abutment surface; and said curved surface section is a surface of revolution whose diameter decreases continuously from a diameter of said cylindrical surface section toward said abutment surface.*

*28. A flywheel assembly as set forth in claim 27, wherein said flywheel body comprises a side surface facing toward said elastic plate, and said engaging surface which faces away from said elastic plate and which extends in an imaginary flat plane; and said second member end of said reinforcing member is located axially between said engaging surface and said side surface of said flywheel body and away from said imaginary flat plane.*

*29. A flywheel assembly as set forth in claim 25, wherein said flywheel body comprises an inner portion defining a circular central hole, and an outer portion surrounding said inner portion of said flywheel body; said elastic plate comprises an outer portion which surrounds said inner portion of said elastic plate and which is fixed to said outer portion of said flywheel body; and said reinforcing member comprises an outer circumferential surface allowing said inner portion of said flywheel body to move axially toward said elastic plate without limiting an axial movement of the inner portion of said flywheel body toward said elastic plate.*

*30. A flywheel assembly as set forth in claim 25, wherein said flywheel body comprises a side surface facing toward said elastic plate, and said engaging surface which faces away from said elastic plate; and said reinforcing member comprises a radially extending abutment surface held in contact with said elastic plate, and an outer circumferential curved surface which extends continuously from said abutment surface to a curved surface end which is located axially between said side surface of said flywheel body and said engaging surface of said flywheel body.*

*31. A flywheel assembly as set forth in claim 30, wherein said outer circumferential curved surface of said reinforcing member is a surface of revolution whose diameter increases continuously from said abutment surface of said reinforcing member to said curved surface end of said outer circumferential curved surface.*

*32. A flywheel assembly as set forth in claim 30, wherein said reinforcing member extends axially from a first member end defined by said abutment surface to a second member end which is located axially between said engaging surface and said side surface of said flywheel body; and an axial distance of said second member end of said reinforcing member from said abutment surface of said reinforcing member is smaller than an axial distance of said engaging surface of said flywheel body from said abutment surface of said reinforcing member.*

*33. A flywheel assembly as set forth in claim 30, wherein said engaging surface of said flywheel body extends in an imaginary flat plane; and said reinforcing member extends axially from a first member end defined by said abutment surface to a second member end which is located axially between said engaging surface and said side surface of said flywheel body and which is away from said imaginary flat plane.*

*34. A flywheel assembly as set forth in claim 30, wherein said flywheel body comprises an inner portion defining a circular central hole, and an outer portion surrounding said inner portion of said flywheel body; said elastic plate comprises an outer portion which surrounds said inner portion of said elastic plate and which is fixed to said outer portion of said flywheel body; said reinforcing member comprises a received portion which is received in said central hole of said flywheel body; and said outer curved surface of said reinforcing member extends continuously from said abutment surface to said received portion.*

*35. A flywheel assembly as set forth in claim 34, wherein said received portion of said reinforcing member comprises a cylindrical outside surface received in said central hole of said flywheel body, and the diameter of said curved surface increases continuously from said abutment surface to a diameter of said cylindrical surface of said reinforcing member.*

*36. A flywheel assembly as set forth in claim 33, wherein said axial rigidity is in the range of 600 kg/mm to 1700 kg/mm.*

*37. A flywheel assembly as set forth in claim 33, wherein an axial run-out of said engaging surface when rotated by said crankshaft is no more than 0.1 mm.*

*38. A flywheel assembly as set forth in claim 37, wherein said engaging surface of said flywheel body is formed so as to make the axial run-out no more than 0.1 mm by processing said engaging surface of said flywheel body in an assembled state in which said crankshaft, said elastic plate, said flywheel body and said reinforcing member are assembled in a unit.*

*39. A flywheel assembly as set forth in claim 33, wherein said side surface of said flywheel body comprises an outer side surface section which faces toward said elastic plate and which is fastened to an outer portion of said elastic plate and an inner side surface section which faces toward said elastic plate, which is surrounded by said outer side surface section of said flywheel body, and which is raised from said outer side surface section axially toward said elastic plate.*

*40. A flywheel assembly according to claim 25, wherein said first portions of said flywheel body and said elastic plate define a space consisting essentially of said first clearance.*

*41. A flywheel assembly according to claim 25, wherein said first portion of said flywheel body slidably contacts an axial surface of said radially extending portion of said reinforcing member.*

*42. A flywheel assembly according to claim 25, wherein said flywheel body axially moves corresponding to said axial rigidity of said elastic plate in the range of 600 kg/mm to 2200 kg/mm without contact on its radial surfaces when said flywheel is engaged and disengaged.*

*43. A flywheel assembly as set forth in claim 25, wherein said axial rigidity is in the range of 600 kg/mm to 1700 kg/mm.*

*44. A flywheel assembly as set forth in claim 43, wherein an axial run-out of said engaging surface when rotated by said crankshaft is no more than 0.1 mm.*

*45. A flywheel assembly according to claim 25, wherein said elastic plate is clamped axially between said reinforcing member and said shaft end of said crankshaft by a fastening means.*

*46. A flywheel assembly according to claim 25, wherein said elastic plate is circular and comprises an outer peripheral portion (2b) surrounding said first portion of said elastic plate, so that said first portion of said elastic plate is an inner portion of said elastic plate, said flywheel body comprises an outer peripheral portion (5a) which surrounds said first portion of said flywheel body, so that said first portion of said flywheel body is an inner portion of said flywheel body, said outer peripheral portions of said elastic plate and said flywheel body are fastened together by a second fastening means (6), said inner portion of said flywheel body comprises an inwardly facing inside cylindrical surface defining a central circular hole (5b), said reinforcing member comprises a cylindrical portion (4a) which is received in said circular hole (5b) of said flywheel body, and comprises an outwardly facing outside cylindrical surface surrounded by said inwardly facing cylindrical surface of said flywheel body.*

*47. A flywheel assembly according to claim 46, wherein said inner portion of said flywheel body comprises a first surface (5f) which is parallel to said engaging surface (5g) and which faces toward said elastic plate, and a second surface (5d) which is parallel to said engaging surface, said inner portion of said elastic plate comprising an abutting surface confronting said first surface of said flywheel body and limiting an axial movement of said inner portion of said flywheel body by abutting against said first surface of said flywheel body.*

*48. A flywheel assembly according to claim 47, wherein said second surface (5d) of said inner portion of said flywheel body is located axially between said first surface (5f) and said engaging surface (5g) of said flywheel body.*

*49. A flywheel assembly as set forth in claim 25, wherein:*

*said elastic plate is a circular elastic plate (2) which further comprises an outer portion, and said inner portion extends radially inwardly from said outer portion to said inner portion;*

*said fly wheel body is an annular flywheel body (5) which comprises an outer portion and an inner portion and extending radially inwardly from said outer portion to said inner portion of said flywheel body, said outer portion of said flywheel body being fastened to said outer portion of said elastic plate, said inner portion of said flywheel body comprising a central circular hole; and*

*said reinforcing member further comprises a cylindrical portion (4a) axially extending from a first member end to a second member end, an inner portion extending radially inwardly from said first member end of said cylindrical portion, and an outward flange (4b) extending radially outwardly from said second member end of said cylindrical portion, said inner portion of said reinforcing member being fastened to said shaft end of said crankshaft, said cylindrical portion of said reinforcing member being fit in said circular hole of said flywheel body with a clearance to form a loose fit;*

*wherein said inner portion of said elastic plate is fixedly clamped between said shaft end of said crankshaft and said inner portion of said reinforcing member, said inner portion of said flywheel body is fit over said cylindrical portion of said reinforcing member.*

*50. A flywheel assembly according to claim 49, wherein a wall thickness of said inner portion of said reinforcing member is greater than a wall thickness of each of said outward flange of said reinforcing member and said inner portion of said elastic plate, said wall thickness of each of said inner portion and said outward flange of said reinforcing member and said inner portion of said elastic plate being a dimension measured in an axial direction parallel to an axis of said crankshaft.*

*51. A flywheel assembly according to claim 49, further comprising a first fastening means for fastening said outer portions of said elastic plate and said flywheel body together, and a second fastening means for fastening said inner portions of said elastic plate and said reinforcing member to said shaft end of said crankshaft, each of said first and second fastening means comprises screw fasteners extending axially along an axis of said crankshaft.*

*52. A flywheel assembly according to claim 25, wherein said radially extending portion further comprises a radially extending section (4b) at least partially overlapping the first portion of said flywheel body in a radial direction.*

*53. A flywheel assembly flywheel assembly of a power transmission system for transmitting engine torque, said flywheel assembly comprising:*

*a crankshaft;*

*an elastic plate comprising an inner portion secured to a shaft end of said crankshaft;*

*a flywheel body secured to said elastic plate and having an engaging surface for engaging with the clutch disc; and*

*a reinforcing member for reinforcing said elastic plate at said inner portion of said elastic plate;*

*wherein said engaging surface has an axial run-out which is no more than 0.1 mm;*

*wherein said elastic plate is clamped axially between said reinforcing member and said shaft end of said crankshaft, and*

*wherein a first portion of said flywheel moves axially with respect to said reinforcing member and said elastic plate,*

*wherein said reinforcing member has a radially extending portion which extends at least inwardly of said flywheel body, and wherein said elastic plate comprises a first portion, said first portion of said flywheel body being placed axially after said first portion of said elastic plate, and said first portions of said flywheel body and said elastic plate defining a first clearance, and said flywheel body having a first free space on a side opposite of the flywheel facing the elastic plate for allowing said first portion of said flywheel body to move axially within the first clearance and the free space.*

*54. A flywheel assembly as claimed in 53, wherein said flywheel body comprises an inner portion defining a circular central hole, and an outer portion surrounding said inner portion of said flywheel body; said elastic plate comprises an outer portion which surrounds said inner portion of said elastic plate and which is fixed to said outer portion of said flywheel body; said reinforcing member is fit in said central hole of said flywheel body with a clearance to form a loose fit; and said reinforcing member comprises an outer circumferential surface for allowing said inner portion of said flywheel body to move axially to said elastic plate without limiting an axial movement of the inner portion of said flywheel body toward said elastic plate.*

*55. A flywheel assembly as set forth in claim 54, wherein said reinforcing member extends axially from a first member end defined by a radially extending abutment surface held in contact with said elastic plate, to a second member end; said outer circumferential surface of said reinforcing member extends continuously from said abutment surface toward said second member end of said reinforcing member; said outer circumferential surface of said reinforcing member comprises an outer cylindrical surface section fit in said central hole of said flywheel body, and an outer curved surface section which extends continuously from said outer cylindrical surface section to said abutment surface; and said curved surface section is a surface of revolution whose diameter decreases from a diameter of said cylindrical surface section toward said abutment surface.*

*56. A flywheel assembly as set forth in claim 55, wherein said flywheel body comprises a side surface facing toward said elastic plate, and said engaging surface which faces away from said elastic plate and which extends in an imaginary flat plane; and said second member end of said reinforcing member is located axially between said engaging surface and said side surface of said flywheel body and away from said imaginary flat plane.*

*57. A flywheel assembly as set forth in claim 53, wherein said flywheel body comprises an inner portion defining a circular central hole, and an outer portion surrounding said inner portion of said flywheel body; said elastic plate comprises an outer portion which surrounds said inner portion of said elastic plate and which is fixed to said outer portion of said flywheel body; and said reinforcing member comprises an outer circumferential surface allowing said inner portion of said flywheel body to move axially toward said elastic plate without limiting an axial movement of the inner portion of said flywheel body toward said elastic plate.*

*58. A flywheel assembly as set forth in claim 53, wherein said flywheel body comprises a side surface facing toward said elastic plate, and said engaging surface which faces away from said elastic plate; and said reinforcing member comprises a radially extending abutment surface held in contact with said elastic plate, and an outer circumferential curved surface which extends continuously from said abutment surface to a curved surface end which is located axially between said side surface of said flywheel body and said engaging surface of said flywheel body.*

*59. A flywheel assembly as set forth in claim 58, wherein said outer circumferential curved surface of said reinforcing member is a surface of revolution whose diameter increases from said abutment surface of said reinforcing member to said curved surface end of said outer circumferential curved surface.*

*60. A flywheel assembly as set forth in claim 58, wherein said reinforcing member extends axially from a first member end defined by said abutment surface to a second member end which is located axially between said engaging surface and said side surface of said flywheel body; and an axial distance of said second member end of said reinforcing member from said abutment surface of said reinforcing member is smaller than an axial distance of said engagement surface of said flywheel body from said abutment surface of said reinforcing member.*

*61. A flywheel assembly as set forth in claim 58, wherein said engaging surface of said flywheel body extends in an imaginary flat plane; and said reinforcing member extends axially from a first member end defined by said abutment surface to a second member end which is located axially between said engaging surface and said side surface of said flywheel body and which is away from said imaginary flat plane.*

*62. A flywheel assembly as set forth in claim 61, wherein said flywheel body comprises an inner portion defining a circular central hole, and an outer portion surrounding said inner portion of said flywheel body; said elastic plate comprises an outer portion which surrounds said inner portion of said elastic plate and which is fixed to said outer portion of said flywheel body; said reinforcing member comprises a received portion which is received in said central hole of said flywheel body; and said outer curved surface of said reinforcing member extends continuously from said abutment surface to said received portion.*

*63. A flywheel assembly as set forth in claim 62, wherein said received portion of said reinforcing member comprises a cylindrical outside surface received in said central hole of said flywheel body, and the diameter of said curved surface increases continuously from said abutment surface to a diameter of said cylindrical surface of said reinforcing member.*

*64. A flywheel assembly as set forth in claim 61, wherein said engaging surface of said flywheel body is formed so as to make the axial run-out no more than 0.1 mm by processing said engaging surface of said flywheel body in an assembled state in which said crankshaft, said elastic plate, said flywheel body and said reinforcing member are assembled in a unit.*

*65. A flywheel assembly according to claim 53, wherein said first portions of said flywheel body and said elastic plate define a space consisting essentially of said first clearance.*

*66. A flywheel assembly according to claim 53, wherein said first portion of said flywheel body slidably contacts an axial surface of said radially extending portion of said reinforcing member.*

*67. A flywheel assembly according to claim 53, wherein said elastic plate has an axial rigidity in the range of 600 kg/mm to 2200 kg/mm so as to ensure transmission of engine torque through said flywheel assembly, while decreasing noise produced by a bending vibration of said crankshaft; and wherein said flywheel body axially moves corresponding to said axial rigidity of said elastic plate in the range of 600 kg/mm to 2200 kg/mm without contact on its radial surfaces when said flywheel is engaged and disengaged.*

*68. A flywheel assembly as set forth in claim 53, wherein said elastic plate has an axial rigidity in the range of 600 kg/mm to 2200 kg/mm so as to ensure transmission of engine torque through said flywheel assembly, while decreasing noise produced by a bending vibration of said crankshaft.*

*69. A flywheel assembly according to claim 68, wherein said elastic plate is clamped axially between said reinforcing member and said shaft end of said crankshaft by a fastening means.*

*70. A flywheel assembly according to claim 68, wherein said elastic plate has an axial rigidity which is in the range of 600 kg/mm to 1700 kg/mm.*

*71. A flywheel assembly according to claim 53, wherein said elastic plate is circular and comprises an outer peripheral portion (2b) surrounding said first portion of said elastic plate, so that said first portion of said elastic plate is an inner portion of said elastic plate, said flywheel body comprises an outer peripheral portion (5a) which surrounds said first portion of said flywheel body, so that said first portion of said flywheel body is an inner portion of said flywheel body, said outer peripheral portions of said elastic plate and said flywheel body are fastened together by a second fastening means (6), said inner portion of said flywheel body comprises an inwardly facing inside cylindrical surface defining a central circular hole (5b), said reinforcing member comprises a cylindrical portion (4a) which is received in said circular hole (5b) of said flywheel body, and comprises an outwardly facing outside cylindrical surface surrounded by said inwardly facing cylindrical surface of said flywheel body.*

*72. A flywheel assembly according to claim 71, wherein said inner portion of said flywheel body comprises a first surface (5f) which is parallel to said engaging surface (5g) and which faces toward said elastic plate, and a second surface (5d) which is parallel to said engaging surface, said inner portion of said elastic plate comprising an abutting surface confronting said first surface of said flywheel body and limiting an axial movement of said inner portion of said flywheel body by abutting against said first surface of said flywheel body.*

*73. A flywheel assembly according to claim 72, wherein said second surface (5d) of said inner portion of said flywheel body is located axially between said first surface (5f) and said engaging surface (5g) of said flywheel body.*

*74. A flywheel assembly as set forth in claim 53, wherein:*

*said elastic plate is a circular elastic plate (2) which further comprises an outer portion, and said inner portion extends radially inwardly from said outer portion to said inner portion;*

*said fly wheel body is an annular flywheel body (5) which comprises an outer portion and an inner portion and extending radially inwardly from said outer portion to said inner portion of said flywheel body, said outer portion of said flywheel body being fastened to said outer portion of said elastic plate, said inner portion of said flywheel body comprising a central circular hole; and*

*said reinforcing member further comprises a cylindrical portion (4a) axially extending from a first member end to a second member end, an inner portion extending radially inwardly from said first member end of said cylindrical portion, and an outward flange (4b) extending radially outwardly from said second member end of said cylindrical portion, said inner portion of said reinforcing member being fastened to said shaft end of said crankshaft, said cylindrical portion of said reinforcing member being fit in said circular hole of said flywheel body with a clearance to form a loose fit;*

*wherein said inner portion of said elastic plate is fixedly clamped between said shaft end of said crankshaft and said inner portion of said reinforcing member, said inner portion of said flywheel body is fit over said cylindrical portion of said reinforcing member.*

*75. A flywheel assembly according to claim 74, wherein a wall thickness of said inner portion of said reinforcing member is greater than a wall thickness of each of said outward flange of said reinforcing member and said inner portion of said elastic plate, said wall thickness of each of said inner portion and said outward flange of said reinforcing member and said inner portion of said elastic plate being a dimension measured in an axial direction parallel to an axis of said crankshaft.*

*76. A flywheel assembly according to claim 74, further comprising a first fastening means for fastening said outer portions of said elastic plate and said flywheel body together, and a second fastening means for fastening said inner portions of said elastic plate and said reinforcing member to said shaft end of said crankshaft, each of said first and second fastening means comprises screw fasteners extending axially along an axis of said crankshaft.*

*77. A flywheel assembly according to claim 53, wherein said radially extending portion further comprises a radially extending section (4b) at least partially overlapping the first portion of said flywheel body in a radial direction.*

* * * * *